US012761423B2

(12) United States Patent
Wilson et al.

(10) Patent No.: US 12,761,423 B2
(45) Date of Patent: Oct. 13, 2026

(54) FIBER OPTIC CONNECTOR WITH MOLDED TUBE FOR FACILITATING INJECTION OF BONDING MATERIAL

(71) Applicant: CommScope Technologies LLC, Hickory, NC (US)

(72) Inventors: Connor Thomas Wilson, Maple Grove, MN (US); Steven Conrad Zimmel, Minneapolis, MN (US)

(73) Assignee: CommScope Technologies LLC, Claremont, NC (US)

( * ) Notice: Subject to any disclaimer, the term of this patent is extended or adjusted under 35 U.S.C. 154(b) by 582 days.

(21) Appl. No.: 18/171,788

(22) Filed: Feb. 21, 2023

(65) Prior Publication Data

US 2023/0266539 A1 Aug. 24, 2023

Related U.S. Application Data

(60) Provisional application No. 63/312,316, filed on Feb. 21, 2022.

(51) Int. Cl.
*G02B 6/38* (2006.01)
*G02B 6/36* (2006.01)

(52) U.S. Cl.
CPC ......... *G02B 6/3825* (2013.01); *G02B 6/3696* (2013.01); *G02B 6/3821* (2013.01); *G02B 6/3861* (2013.01)

(58) Field of Classification Search
None
See application file for complete search history.

(56) References Cited

U.S. PATENT DOCUMENTS

| | | | |
|---|---|---|---|
| 4,834,487 | A | 5/1989 | Abendschein et al. |
| 5,080,460 | A | 1/1992 | Erdman et al. |
| 5,096,274 | A | 3/1992 | Fuschetto et al. |
| 5,131,063 | A | 7/1992 | Monroe et al. |
| 5,181,267 | A | 1/1993 | Gerace et al. |
| 5,363,459 | A | 11/1994 | Hultermans |
| 5,375,183 | A | 12/1994 | Edwards et al. |
| 5,436,994 | A | 7/1995 | Ott et al. |
| 5,465,313 | A | 11/1995 | Belenkiy et al. |
| 5,717,802 | A | 2/1998 | Briggs et al. |
| 5,778,126 | A | 7/1998 | Saitoh |
| 6,318,905 | B1 | 11/2001 | Valencia et al. |
| 7,261,472 | B2 | 8/2007 | Suzuki et al. |
| 7,997,806 | B2 | 8/2011 | Nakagawa |
| 8,858,090 | B2 | 10/2014 | Henke et al. |
| 2006/0115219 | A1 | 6/2006 | Mudd et al. |
| 2009/0214164 | A1 | 8/2009 | Nakagawa |
| 2011/0008003 | A1 | 1/2011 | Tamekuni et al. |

(Continued)

FOREIGN PATENT DOCUMENTS

| | | | | |
|---|---|---|---|---|
| CA | 2852297 | A1 * | 8/2014 | ........... G02B 6/3874 |
| EP | 1443350 | A2 * | 8/2004 | ........... G02B 6/3888 |

(Continued)

*Primary Examiner* — Chris H Chu
(74) *Attorney, Agent, or Firm* — Merchant & Gould P.C.

(57) ABSTRACT

The present disclosure relates to a fiber optic connector including a ferrule assembly in which an optical fiber is secured by bonding material. The fiber optic connector includes a molded tube for facilitating injecting the bonding material into the ferrule assembly during manufacture of the fiber optic connector.

13 Claims, 7 Drawing Sheets

(56) References Cited

U.S. PATENT DOCUMENTS

| | | | | |
|---|---|---|---|---|
| 2015/0177097 | A1* | 6/2015 | Clarke | G02B 6/3843 356/73.1 |
| 2015/0346452 | A1* | 12/2015 | Chien | G02B 6/4497 156/711 |
| 2018/0059334 | A1 | 3/2018 | Lu et al. | |

FOREIGN PATENT DOCUMENTS

| | | | |
|---|---|---|---|
| WO | 2015016897 | A1 | 2/2015 |
| WO | 2015103783 | A1 | 7/2015 |
| WO | 2021011549 | A1 | 1/2021 |
| WO | 2021011651 | A1 | 1/2021 |
| WO | 2021011666 | A1 | 1/2021 |
| WO | 2021011794 | A1 | 1/2021 |

* cited by examiner

FIBER OPTIC CONNECTOR WITH MOLDED TUBE FOR FACILITATING INJECTION OF BONDING MATERIAL

CROSS-REFERENCE TO RELATED APPLICATION(S)

This application claims the benefit of U.S. Provisional Application Ser. No. 63/312,316, filed Feb. 21, 2022, the disclosure of which is hereby incorporated by reference in its entirety.

TECHNICAL FIELD

The present disclosure relates to fiber optic connectors and to methods for assembling fiber optic connectors.

BACKGROUND

Fiber optic connectors (e.g., LC connectors, SC Connectors, and MPO connectors, etc.) typically each include a ferrule in which one or more optical fibers are secured by a bonding material such as epoxy. During connector manufacture, the ferrule can be located inside a connector body during the application (e.g., injection) of the bonding material into the ferrule. It is therefore desirable to control the placement of the bonding material to prevent unintended components from being bonded and/or locked in place within the connector body.

SUMMARY

One aspect of the present disclosure relates to a fiber optic connector including a front connector body having a front end and a rear end. The front end of the front connector body defines a connector plug portion. The front connector body defines an interior including a hub seat. The fiber optic connector also includes a ferrule assembly including a ferrule and a ferrule hub. The ferrule has a front end and a rear end. The ferrule defines a ferrule passage that extends axially through the ferrule between the front end and the rear end of the ferrule. The ferrule hub is mounted at the rear end of the ferrule. The ferrule hub has a front end and a rear end. The ferrule hub includes a hub passage that extends axially through the ferrule hub between the front end of the ferrule hub and the rear end of the ferrule hub. The ferrule hub includes a front spring stop at an exterior of the ferrule hub at a location between the front and rear ends of the ferrule hub. The hub passage defines a hub passage cross-dimension. The fiber optic connector further includes a rear connector body secured at the rear end of the front connector body. The rear connector body includes a front end and a rear end. The rear connector body includes a rear connector body passage that extends axially through the rear connector body between the front end and the rear end of the rear connector body. The rear connector body includes a rear spring stop. A spring is captured between the front and rear spring stops for biasing the ferrule assembly in a forward direction such that the front end of the ferrule hub is spring biased against the hub seat of the front connector body when the ferrule assembly is in a full forward position. The fiber optic connector also includes a tube having a front end and a rear end. The front end of the tube is mounted at the rear end of the ferrule hub. The tube defines a tube passage that extends axially through the tube between the front and rear ends of the tube. The tube extends within the rear connector body passage and within the spring. The tube passage includes a tapered region including a major end defining a major cross-dimension and a minor end defining a minor cross-dimension. The minor end is positioned forwardly with respect to the major end. The minor cross-dimension is smaller than the hub passage cross-dimension and the major cross-dimension is larger than the hub passage cross-dimension. An optical fiber extends within the tube passage, the hub passage, and the ferrule passage. A bonding material is provided within the hub passage and the ferrule passage for securing the optical fiber within the hub passage and the ferrule passage.

Another aspect of the present disclosure relates to a method for installing an optical fiber in a ferrule assembly. The ferrule assembly includes a ferrule and a ferrule hub. The ferrule has a front end and a rear end. The ferrule defines a ferrule passage that extends axially through the ferrule between the front end and the rear end of the ferrule. The ferrule hub is mounted at the rear end of the ferrule. The ferrule hub has a front end and a rear end. The ferrule hub includes a hub passage that extends axially through the ferrule hub between the front end of the ferrule hub and the rear end of the ferrule hub. The hub passage defines a hub passage cross-dimension. The method includes the step of mounting a tube at the rear end of the ferrule hub. The tube has a front end and a rear end. The front end of the tube is mounted at the rear end of the ferrule hub. The tube defines a tube passage that extends axially through the tube between the front and rear ends of the tube. The tube passage includes a tapered region including a major end defining a major cross-dimension and a minor end defining a minor cross-dimension. The minor end is positioned forwardly with respect to the major end. The minor cross-dimension is smaller than the hub passage cross-dimension and the major cross-dimension is larger than the hub passage cross-dimension. The method also includes the step of inserting a needle into the tube passage with a tip of the needle seating at the tapered region of the tube passage. The method further includes the step of injecting bonding material from the needle into the hub passage and the ferrule passage while the tip of the needle is seated at the tapered region of the tube passage. The method also includes the steps of removing the needle from the tube passage after injecting the bonding material and inserting the optical fiber through the tube passage and into the hub passage and the ferrule passage after the needle has been removed from the tube passage. The method further includes the step of curing the bonding material after insertion of the optical fiber to secure the optical fiber within the ferrule and the ferrule hub.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
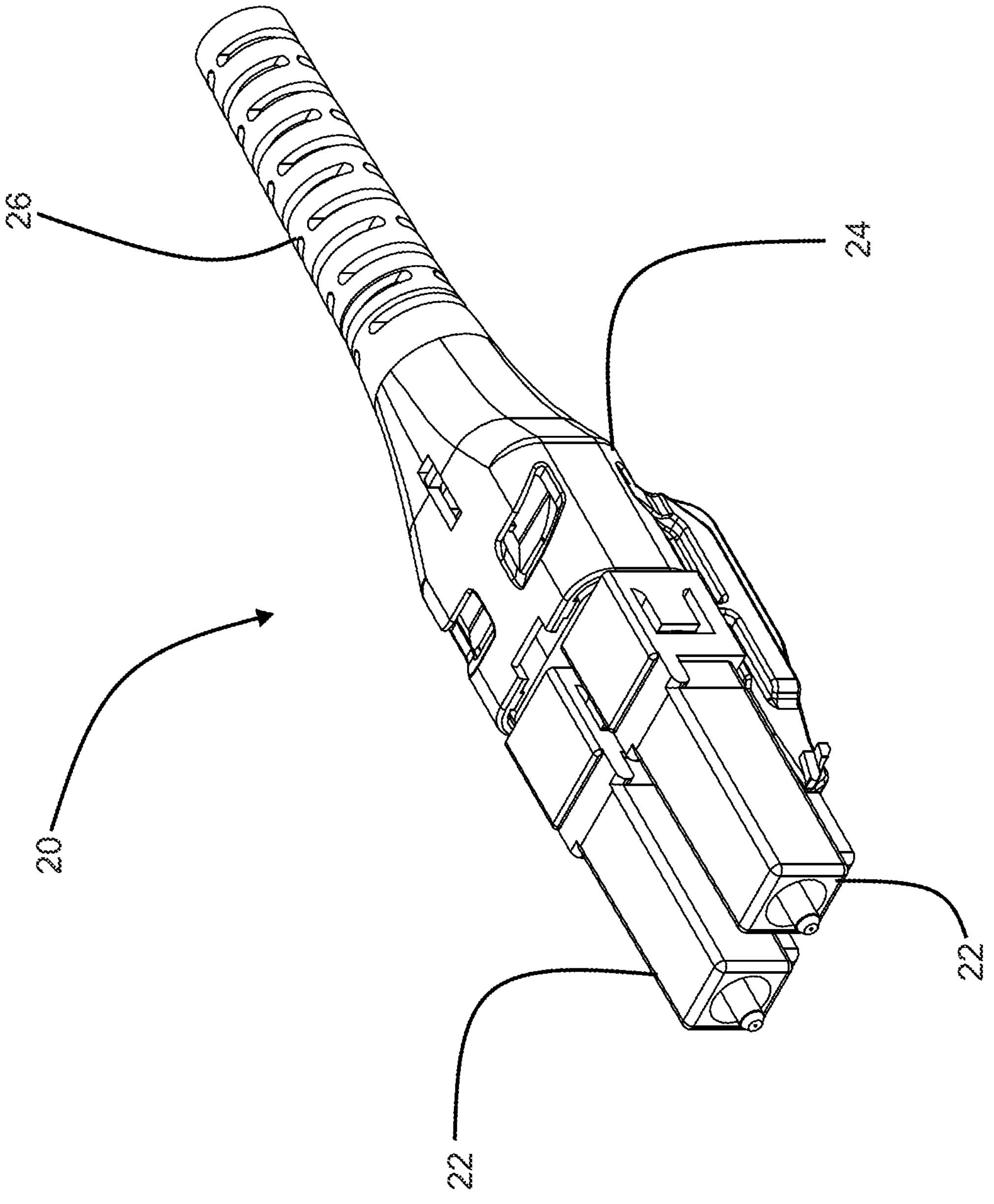
FIG. 1 depicts a duplex fiber optic connector in accordance with the principles of the present disclosure.

FIG. 1 depicts a duplex fiber optic connector 20 in accordance with the principles of the present disclosure. The duplex fiber optic connector 20 is depicted including two fiber optic connectors 22 coupled together by a rear assembly 24 including a single strain relief boot 26. In the depicted example, the duplex fiber optic connector 20 is a duplex LC fiber optic connector and each of the fiber optic connectors 22 are LC fiber optic connectors. While a duplex LC fiber optic connector is depicted, it will be appreciated that aspects of the present disclosure are applicable to any type of ferrulized fiber optic connector, including but not limited to, single ferrule fiber optic connectors, multi-ferrule fiber optic connectors, fiber optic connectors with single fiber ferrules, and fiber optic connectors with multi-fiber ferrules.

Figure 2:
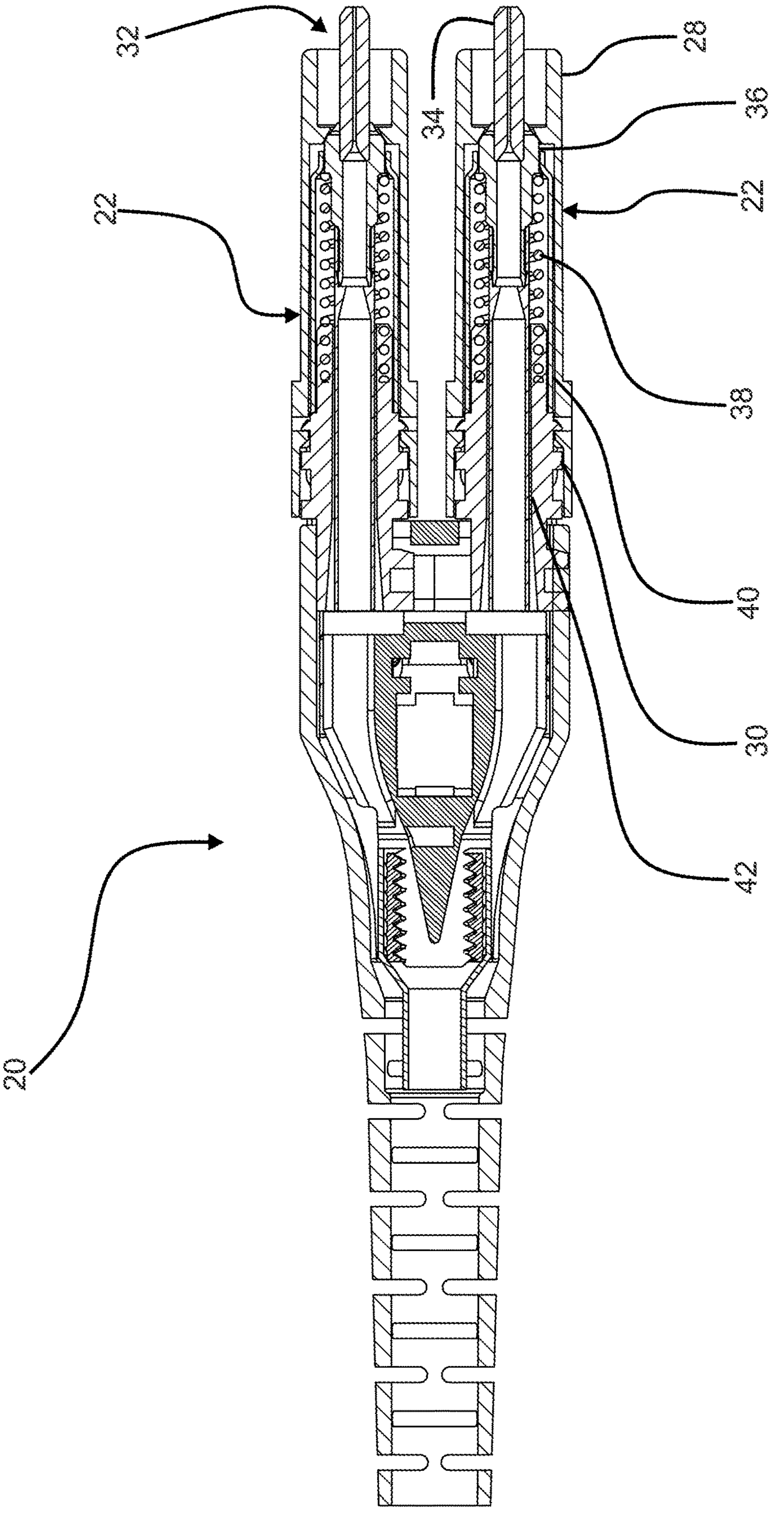
FIG. 2 is a cross-sectional view of the duplex fiber optic connector of FIG. 1 taken along a horizontal cross-sectional plane that bisects the duplex fiber optic connector.
Figure 3:
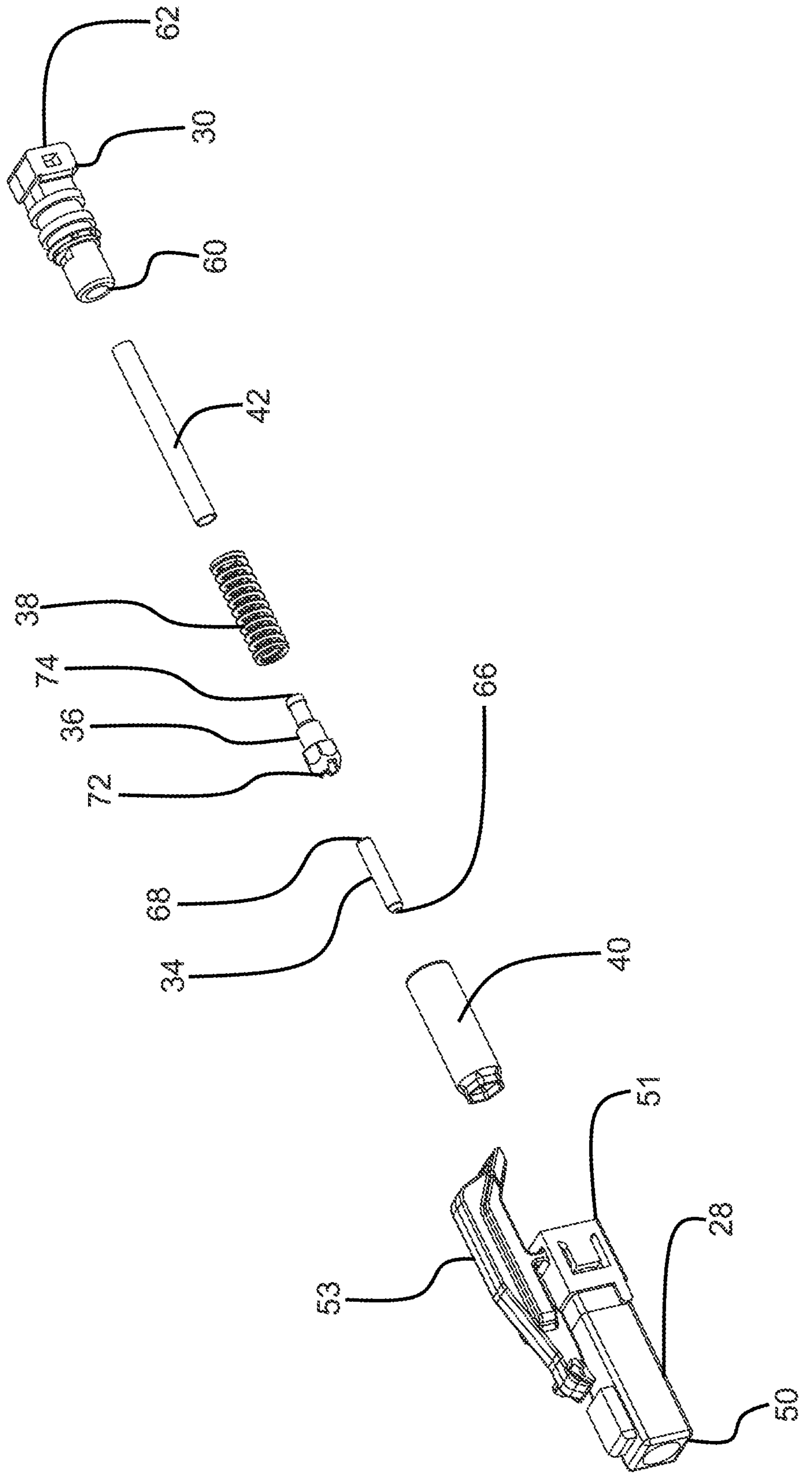
FIG. 3 is an exploded view of a portion of one of the fiber optic connectors of the duplex fiber optic connector of FIG. 1.

Referring to FIGS. 2 and 3, each of the fiber optic connectors 22 includes a front connector body 28, a rear connector body 30, a ferrule assembly 32 including a ferrule 34 and a ferrule hub 36, a spring 38, a spring containment sleeve 40, and a tube 42. The spring containment sleeve 40 attaches to a front portion of the ferrule hub 36 and mounts co-axially over the spring 38. The tube 42 attaches behind the ferrule hub 36 and is adapted to facilitate effectively and precisely injecting a bonding material into the interior of the ferrule hub 36 and the ferrule 34 from a rear of the fiber optic connector 22 (e.g., via an injection needle inserted rearwardly into the fiber optic connector 22 through the rear connector body 30). In a preferred example, the tube 42 is a pre-molded plastic part such as an injection molded plastic part. In one example, the tube 42 has a material composition that includes a polymer. In one example the polymer can include a thermoplastic elastomer (e.g., a composition including a polyester such as a thermoplastic polyester elastomer). By forming the tube 42 as a molded plastic part, the tube can be provided with integrated features (e.g., both internal and external features as needed) adapted for facilitating the precise injection of bonding material into a ferrule and ferrule hub and also adapted for facilitating connecting (e.g., mechanically connecting/attaching) the tube to the ferrule hub. The ability to integrate specific features with the tube 42 allows the tube 42 to be designed to readily be used with existing fiber optic connectors to allow the fiber optic connectors to be retrofitted to include the tube for facilitating the injection of bonding material without requiring modification of the existing features of the fiber optic connectors. Example features can include connection features such as press-fit or snap-fit connection features, stop features such as internal or external stop surfaces (e.g., defined by shoulders), and internal taper features that can function as injection needle seats (e.g., injection needle shut-offs).

Figure 4:
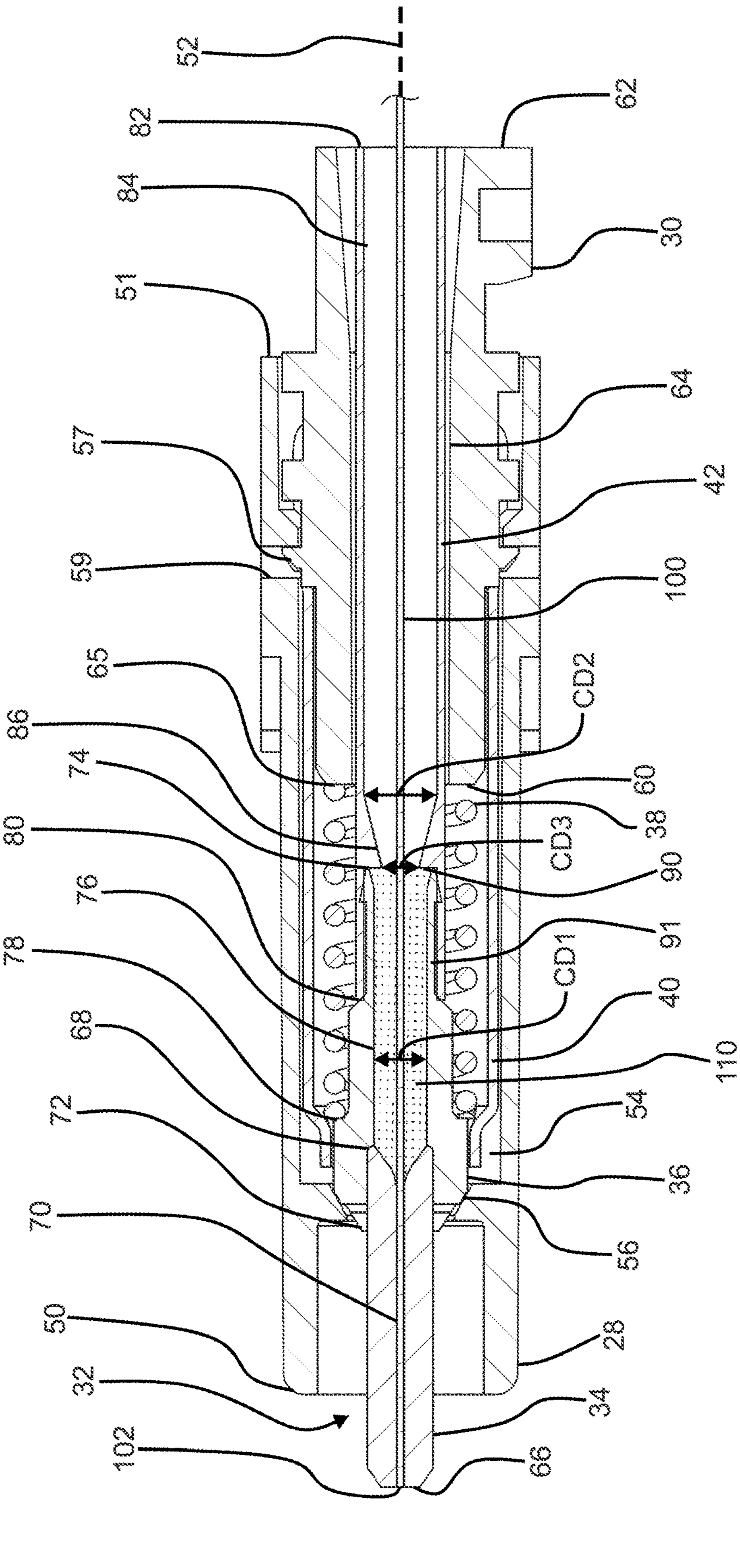
FIG. 4 is a cross-sectional view taken along a vertical cross-sectional plane that bisects one of the fiber optic connectors of the duplex fiber optic connector of FIG. 1.

Referring to FIGS. 3 and 4, the front connector body 28 of each fiber optic connector 22 includes a front end 50 and a rear end 51. The front and rear ends 50, 51 are separated by a length of the front connector body that extends along a central axis 52 of the front connector body 28. The central axis 52 of the front connector body 28 coincides with a central axis of the fiber optic connector 22. The front end 50 of the front connector body 28 defines a connector plug portion adapted to be received within a fiber optic adapter. In the depicted example, the connector plug portion defined by the front connector body 28 has a LC connector form factor adapted to be received within the port of an LC fiber optic adapter and also includes a latch 53 for latching the fiber optic connector 22 within the port of the LC fiber optic adapter. As shown at FIG. 4, the front connector body 28 defines an interior 54 in which a hub seat 56 is provided. In other examples, the front connector body can be provided with other form factors corresponding to other styles of fiber optic connectors.

Referring again to FIGS. 3 and 4, the rear connector body 30 of each fiber optic connector 22 is adapted to be secured at the rear end 51 of the corresponding front connector body 28 in co-axial alignment with the front connector body 28 along the central axis 52. In one example, the rear connector body 30 can be secured (e.g., latched) to the front connector body 28 by a mechanical connection such as a snap-fit connection. As depicted, the mechanical connection is provided by tabs 57 on the rear connector body 30 that snap within corresponding openings 59 defined by the front connector body 28. The rear connector body 30 includes a length that extends between a front end 60 and a rear end 62 of the rear connector body 30. The rear connector body 30 includes a rear connector body passage 64 that extends axially through the rear connector body 30 between the front end 60 and the rear end 62 of the rear connector body 30. The rear connector body 30 also includes a rear spring stop 65. As depicted, the rear spring stop 65 is defined at the front end 60 of the rear connector body 30. The front and rear connector bodies 28, 30 can be molded plastic parts.

As indicated above, the ferrule assembly 32 of each fiber optic connector 22 includes one ferrule 34 and one ferrule hub 36. The ferrule assembly 32 mounts within the corresponding front connector body 28 in co-axial alignment with the central axis 52. In certain examples, the ferrule 34 can have material composition that includes plastic, metal, or ceramic. A common material for ferrules includes a zirconia ceramic, but composite plastic polymers are also commonly used. The ferrule 34 has a length that extends between a front end 66 and a rear end 68 of the ferrule 34. The ferrule 34 defines a ferrule passage 70 that extends axially through the ferrule 34 between the front end 66 and the rear end 68 of the ferrule 34. The ferrule hub 36 mounts at the rear end 68 of the ferrule 34. In certain examples, the ferrule hub 36 can be molded, press-fit, bonded, or otherwise secured onto the ferrule 34. In one example, the ferrule hub 36 has a material composition that includes metal or plastic such as a composite plastic polymer. The ferrule hub 36 has a front end 72 and a rear end 74 and includes a hub passage 76 that extends axially through the ferrule hub 36 between the front and rear ends 72, 74. The ferrule hub 36 includes a front spring stop 78 at an exterior of the ferrule hub 36 at a location between the front and rear ends 72, 74. The front spring stop 78 can be defined by a rearwardly facing surface defined by an outer shoulder (e.g., an outer annular shoulder) of the ferrule hub 36. The hub passage 76 defines a hub passage cross-dimension CD1. In the depicted example, the hub passage 76 is cylindrical and the hub passage cross-dimension CD1 is a diameter of the hub passage 76 which corresponds to an inner diameter of the hub 36. The hub-passage cross-dimension CD1 is the cross-dimension of the hub passage 76 defined along a majority of the length of the passage 76.

Referring to FIG. 4, the spring 38 is captured between the front and rear spring stops 78, 65 and is configured for biasing the ferrule assembly 32 in a forward direction such that the front end 72 of the ferrule hub 36 is spring biased against the hub seat 56 of the front connector body 28 when ferrule assembly 32 is in a full forward position. When the fiber optic connector 22 is coupled with another fiber optic connector via a fiber optic adapter, contact between end faces of the ferrules 34 of the coupled fiber optic connectors causes the ferrule assemblies 32 to be moved rearwardly within their corresponding connectors bodies against the bias of their corresponding springs 38 such that the front ends 72 of the ferrule hubs 36 are rearwardly displaced with respect to their corresponding hub seats 56.

Figure 5:
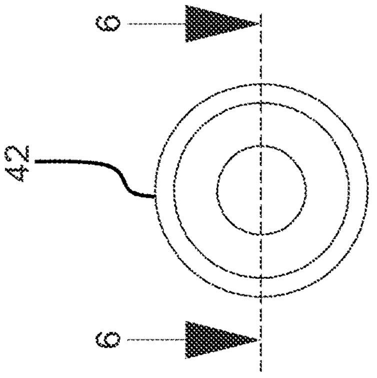
FIG. 5 is an end view of a molded tube installed within the fiber optic connector of FIGS. 3 and 4.
Figure 6:
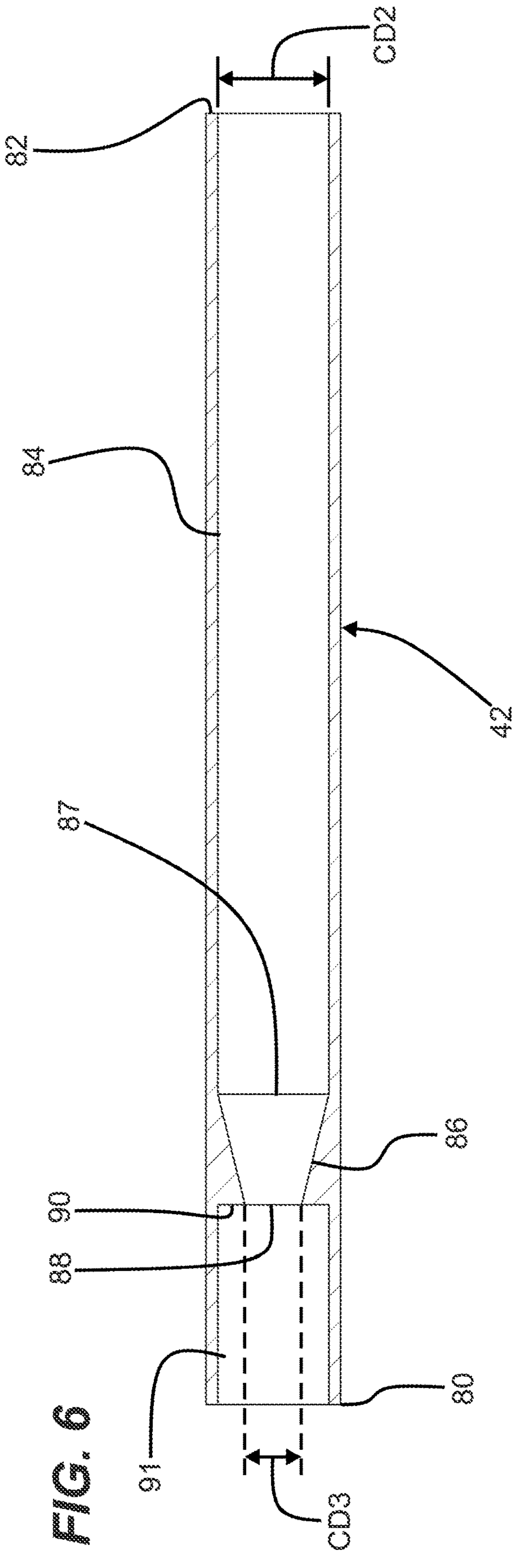
FIG. 6 is a cross-sectional view taken along section line 6-6 of FIG. 5.
Figure 7:
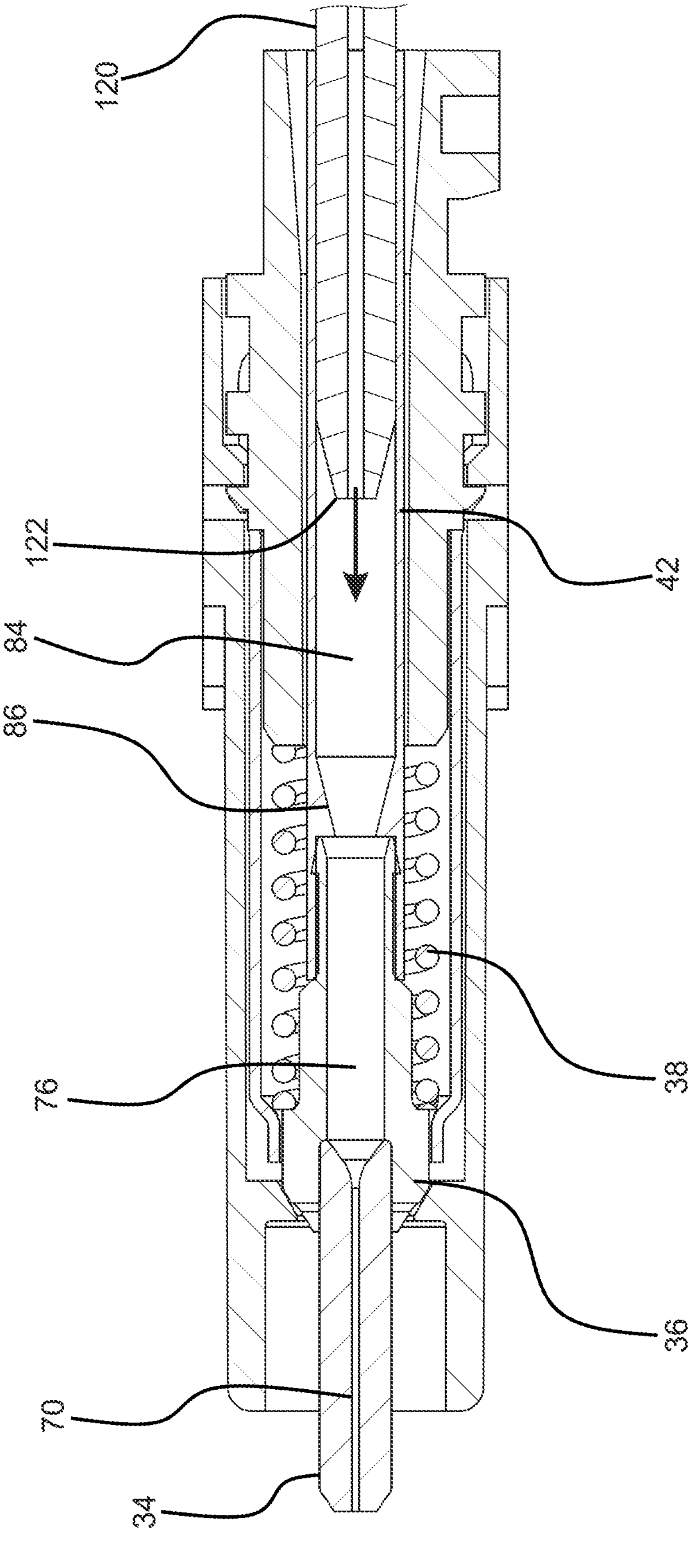
FIG. 7 is the cross-sectional view of FIG. 4 showing an injection needle being inserted within the fiber optic connector.
Figure 8:
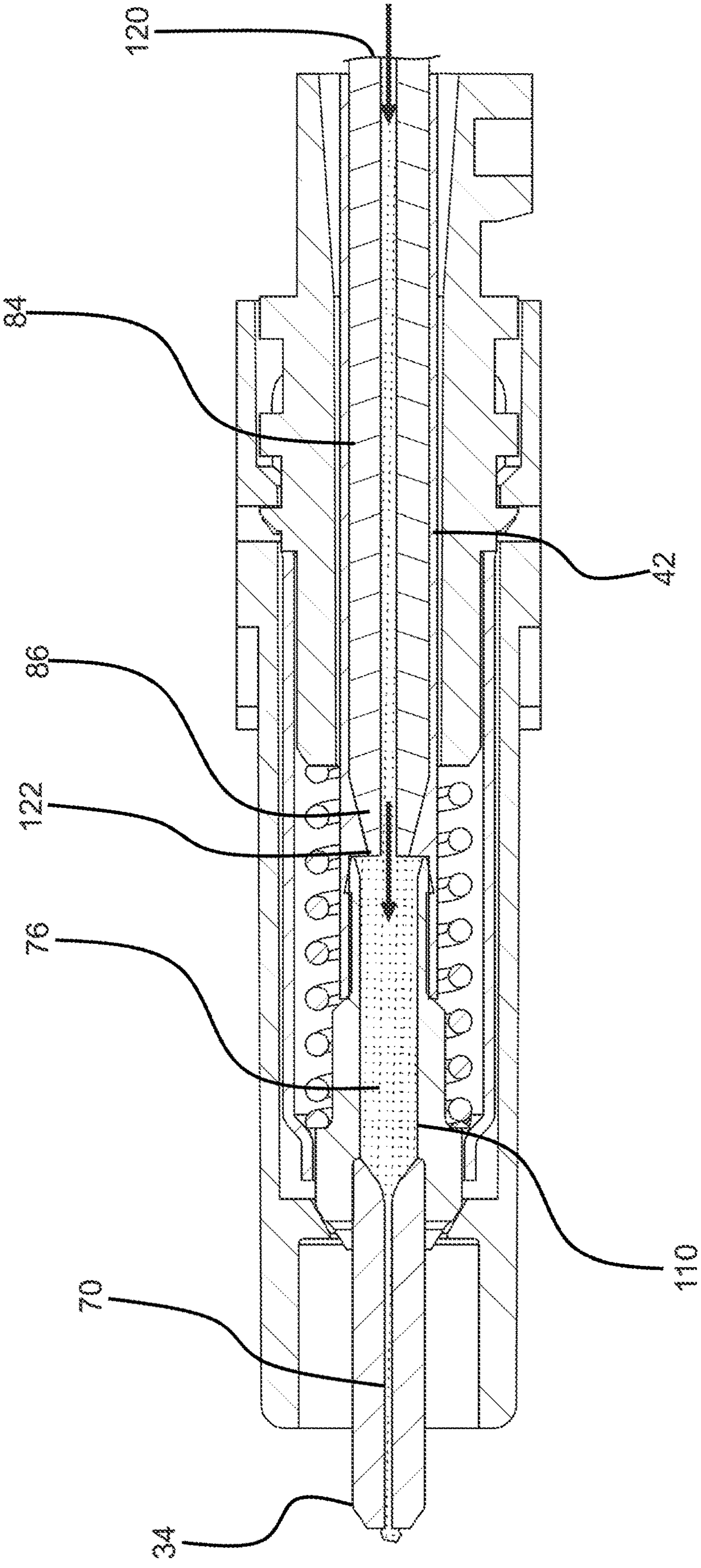
FIG. 8 is the cross-sectional view of FIG. 4 showing the injection needle fully inserted in the fiber optic connector and being used to inject bonding material into a ferrule assembly of the fiber optic connector.

Referring to FIGS. 4-6, the tube 42 of each fiber optic connector 22 is shown defining a tube length that extends between a front end 80 and a rear end 82 of the tube 42. The front end 80 of each tube 42 is mounted at the rear end 74 of a corresponding one of the ferrule hubs 36. Referring to FIGS. 4 and 6, the depicted tube 42 defines a tube passage 84 that extends axially through the tube 42 between the front and rear ends 80, 82. When mounted in the connector housing defined by the front and rear connector bodies 28, 30 as shown at FIG. 4, the tube 42 is aligned with the central axis 52 so as to be co-axially aligned with the front connector body 28, the rear connector body 30, and the ferrule assembly 32. Still referring to FIG. 4, when mounted in the connector housing, the tube 42 extends within the rear connector body passage 64 and within the spring 38. The tube passage 84 includes a tapered region 86 including a major end 87 defining a major cross-dimension CD2 and a minor end 88 defining a minor cross-dimension CD3. The minor cross-dimension CD3 is smaller than the hub passage cross-dimension CD1 and the major cross-dimension CD2 is larger than the hub passage cross-dimension CD1. When the tube 42 is mounted on the ferrule hub 36, the minor end 88 is positioned forwardly with respect to the major end 87, and the minor end 88 is located at the rear end 74 of the ferrule hub 36. In one example, the tube passage 84 is cylindrical and the tapered region 86 has a truncated conical shape. In such an example, the major and minor cross-dimensions CD2 and CD3 are passage diameters that correspond with an inner diameter of the tube 42. In the depicted example, the tube 42 defines an inner stop surface 90 within the tube passage 84 that faces in a forward direction and that abuts against the rear end 74 of the ferrule hub 36. The inner stop surface 90 is defined by an annular shoulder that extends radially outwardly from the minor end 88 of the tapered region 86 of the tube passage 84. The front end 80 of the tube 42 mounts over the rear end 74 of the ferrule hub 36. For example, the tube 42 defines a connection structure in the form of a pocket 91 defined within the tube passage 84 in the region between the front end 80 of the tube 42 and the inner stop surface 90. The pocket 91 is configured to receive the rear end 74 of the ferrule hub 36 such that the front end 80 of the tube is press-fit over the rear end 74 of the ferrule hub 36.

The tube 42 is preferably long enough to facilitate receiving and guiding a needle from the rear end of the fiber optic connector 22. The needle can be configured for injecting a bonding material such as epoxy into the interior of the ferrule 34 and the ferrule hub 36. In one example, the tube 42 extends through at least a majority of a length of the rear connector body passage 64. In the depicted example, the rear end 82 of the tube 42 is located at the rear end 62 of the rear connector body 30.

Referring to FIG. 4, an optical fiber 100 corresponding to a fiber optic cable to which the fiber optic connector 20 is secured extends through the tube passage 84, the hub passage 76, and the ferrule passage 70. An end face 102 of the optical fiber is depicted flush with an end face of the ferrule 32, but in other examples, can be recessed relative to the end face of the ferrule or can project outwardly beyond the end face of the ferrule depending upon the type of end face polishing utilized. Bonding material 110 (e.g., an adhesive material such as epoxy) is provided within the hub passage 76 and the ferrule passage 70 for securing the optical fiber 100 within the hub passage 76 and the ferrule passage 70.

The present disclosure also relates to a method for installing the optical fiber 100 in the ferrule assembly 32. The method includes the step of mounting the tube 42 at the rear end 74 of the ferrule hub 36. The method also includes the step of inserting a needle 120 into the tube passage 84 through the rear end 82 of the tube 42 and seating a tip 122 of the needle 120 at the tapered region 86 of the tube passage 84. The method further includes the step of injecting the bonding material 110 from the needle 120 into the hub passage 76 and the ferrule passage 70 while the tip 122 of the needle 120 is seated at the tapered region 86 of the tube passage 84. The method also includes the steps of removing the needle 120 from the tube passage 84 after injecting the bonding material 110 and inserting the optical fiber 100 through the tube passage 84 and into the hub passage 76 and the ferrule passage 70 after the needle 120 has been removed from the tube passage 84. The method further includes the step of curing the bonding material 110 after insertion of the optical fiber 100 to secure the optical fiber 100 within the ferrule 34 and the ferrule hub 36. The end face 102 of the fiber 100 and the ferrule 34 can be subsequently processed (e.g., polished, cleaned) to remove excess bonding material and to make the end face suitable for making an optical connection with another fiber with minimal loss.

The various examples described above are provided by way of illustration only and should not be construed to limit the scope of the present disclosure. Those skilled in the art will readily recognize various modifications and changes that may be made without departing from the true spirit and scope of the present disclosure.

We claim:

1. A fiber optic connector comprising:

a front connector body having a front end and a rear end, the front end of the front connector body defining a connector plug portion, the front connector body defining an interior including a hub seat;

a ferrule assembly including a ferrule and a ferrule hub, the ferrule having a front end and a rear end, the ferrule defining a ferrule passage that extends axially through the ferrule between the front end and the rear end of the ferrule, the ferrule hub being mounted at the rear end of the ferrule, the ferrule hub having a front end and a rear end, the ferrule hub including a hub passage that extends axially through the ferrule hub between the front end and the rear end of the ferrule hub, the ferrule hub including a front spring stop at an exterior of the ferrule hub at a location between the front and rear ends of the ferrule hub, the hub passage defining a hub passage cross-dimension;

a rear connector body secured at the rear end of the front connector body, the rear connector body including a front end and a rear end, the rear connector body including a rear connector body passage that extends axially through the rear connector body between the front end and the rear end of the rear connector body, the rear connector body including a rear spring stop;

a spring captured between the front and rear spring stops for biasing the ferrule assembly in a forward direction such that the front end of the ferrule hub is spring biased against the hub seat of the front connector body when the ferrule assembly is in a full forward position;

a tube having a front end and a rear end, the front end of the tube being mounted at the rear end of the ferrule hub, the tube defining a tube passage that extends axially through the tube between the front and rear ends of the tube, the tube extending within the rear connector body passage and within the spring, the tube passage including a tapered region including a major end defining a major cross-dimension and a minor end defining a minor cross-dimension, the minor end being positioned forwardly with respect to the major end, the minor cross-dimension being smaller than the hub passage cross-dimension and the major cross-dimension being larger than the hub passage cross-dimension;

an optical fiber that extends within the tube passage, the hub passage, and the ferrule passage; and bonding material within the hub passage and the ferrule passage for securing the optical fiber within the hub passage and the ferrule passage;

wherein the minor end of the tapered region of the tube passage is positioned at the rear end of the ferrule hub, wherein the tube defines an inner stop surface within the tube passage that abuts against the rear end of the ferrule hub.

2. The fiber optic connector of claim 1, wherein the tube is a molded plastic part.

3. The fiber optic connector of claim 1, wherein the tube is an injection molded plastic part.

4. The fiber optic connector of claim 1, wherein the hub passage cross-dimension, the major cross-dimension, and the minor cross-dimension are passage diameters.

5. The fiber optic connector of claim 1, wherein the tapered region of the tube passage has a truncated conical shape.

6. The fiber optic connector of claim 1, wherein the inner stop surface is defined by an annular shoulder that extends radially outwardly from the minor end of the tapered region of the tube passage.

7. The fiber optic connector of claim 1, wherein the front end of the tube mounts over the rear end of the ferrule hub.

8. The fiber optic connector of claim 1, wherein the front end of the tube is press-fit over the rear end of the ferrule hub.

9. The fiber optic connector of claim 1, wherein the bonding material includes epoxy.

10. The fiber optic connector of claim 1, wherein the fiber optic connector is an LC fiber optic connector.

11. The fiber optic connector of claim 10, wherein the LC fiber optic connector is part of a duplex LC fiber optic connector.

12. The fiber optic connector of claim 1, wherein the tube extends through at least a majority of a length of the rear connector body passage.

13. The fiber optic connector of claim 1, wherein the rear end of the tube is located at the rear end of the rear connector body.

* * * * *